(12) United States Patent
Mizuguchi

(10) Patent No.: US 9,365,093 B2
(45) Date of Patent: Jun. 14, 2016

(54) VEHICLE

(71) Applicant: TOYOTA JIDOSHA KABUSHIKI KAISHA, Toyota-shi, Aichi-ken (JP)

(72) Inventor: Makoto Mizuguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/693,210

(22) Filed: Apr. 22, 2015

(65) Prior Publication Data

US 2015/0306936 A1 Oct. 29, 2015

(30) Foreign Application Priority Data

Apr. 25, 2014 (JP) ................. 2014-091308

(51) Int. Cl.
*H01M 10/667* (2014.01)
*B60H 1/00* (2006.01)
*H01M 6/50* (2006.01)

(52) U.S. Cl.
CPC ........ *B60H 1/00735* (2013.01); *B60H 1/00021* (2013.01); *B60H 1/00835* (2013.01); *H01M 6/5038* (2013.01); *B60H 2001/002* (2013.01)

(58) Field of Classification Search
USPC .................................. 701/22, 36; 180/65.29
See application file for complete search history.

(56) References Cited

U.S. PATENT DOCUMENTS

| | | | | |
|---|---|---|---|---|
| 6,828,742 B2 * | 12/2004 | Suzuki | ............... | B60K 6/485 180/65.26 |
| 2009/0139781 A1 * | 6/2009 | Straubel | .............. | B60L 11/1875 180/65.1 |
| 2010/0241308 A1 * | 9/2010 | Kikuchi | ............. | B60H 1/00278 701/36 |
| 2010/0324765 A1 * | 12/2010 | Iida | ..................... | H01M 10/613 701/22 |
| 2011/0190981 A1 * | 8/2011 | Niwa | ...................... | B60H 1/00 701/36 |
| 2011/0307131 A1 * | 12/2011 | Norden | .............. | B60H 1/00278 701/22 |
| 2012/0130577 A1 * | 5/2012 | Ichimoto | ............... | B60W 20/00 701/22 |
| 2012/0245781 A1 * | 9/2012 | Kanamori | ................ | B60K 6/48 701/22 |
| 2012/0253573 A1 * | 10/2012 | Shigyo | ............... | B60H 1/00421 701/22 |
| 2014/0027090 A1 | 1/2014 | Morikawa et al. | | |
| 2015/0210181 A1 * | 7/2015 | Niioka | .................. | H01M 10/48 701/22 |

FOREIGN PATENT DOCUMENTS

| | | | |
|---|---|---|---|
| JP | 2008-105605 A | 5/2008 | |
| JP | 2010-036723 A | 2/2010 | |
| JP | 2012-224199 A | 11/2012 | |

* cited by examiner

*Primary Examiner* — Thomas Tarcza
*Assistant Examiner* — Richard Goldman
(74) *Attorney, Agent, or Firm* — Oliff PLC

(57) ABSTRACT

A vehicle includes a drive motor, a battery, a front seat, a rear seat, a passenger-compartment air conditioning unit, an inlet port, a blower, a temperature sensor and a controller. The controller is configured to control the passenger-compartment air conditioning unit so as to selectively perform a first air conditioning mode, a second air conditioning mode, and a third air conditioning mode. The controller is configured to control the passenger-compartment air conditioning unit so as to perform the third air conditioning mode when the temperature of the battery is higher than a first temperature threshold.

10 Claims, 9 Drawing Sheets

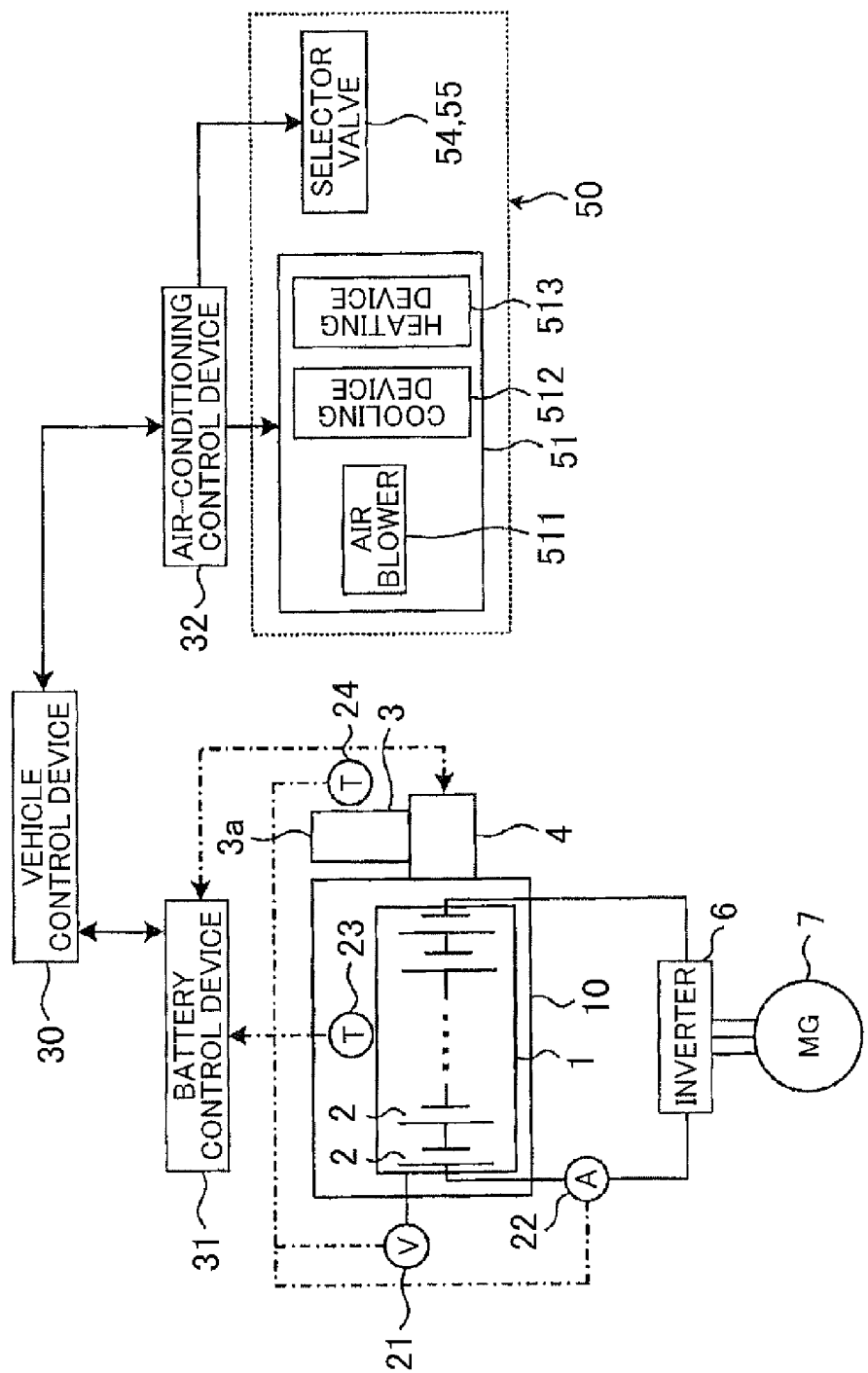

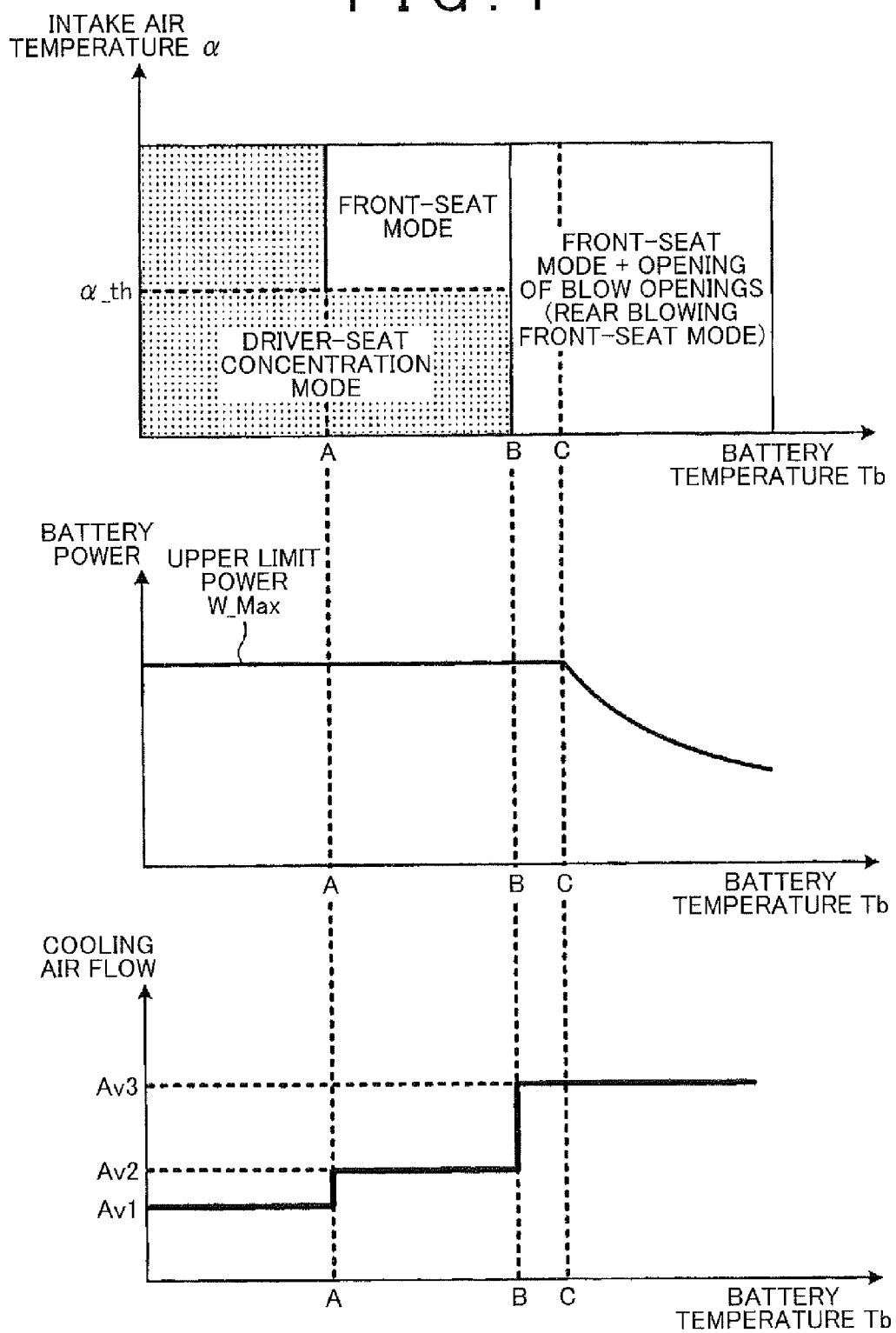

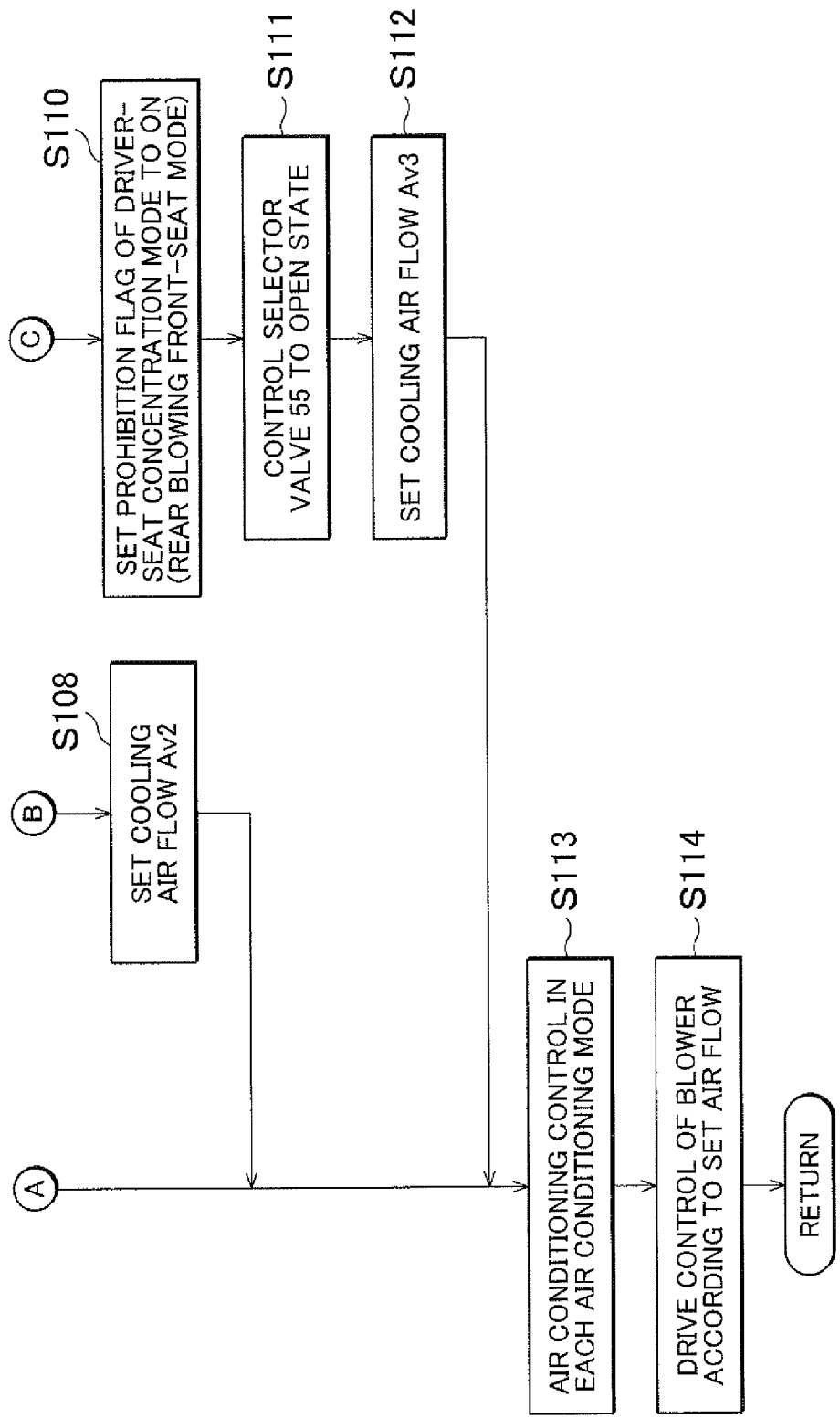

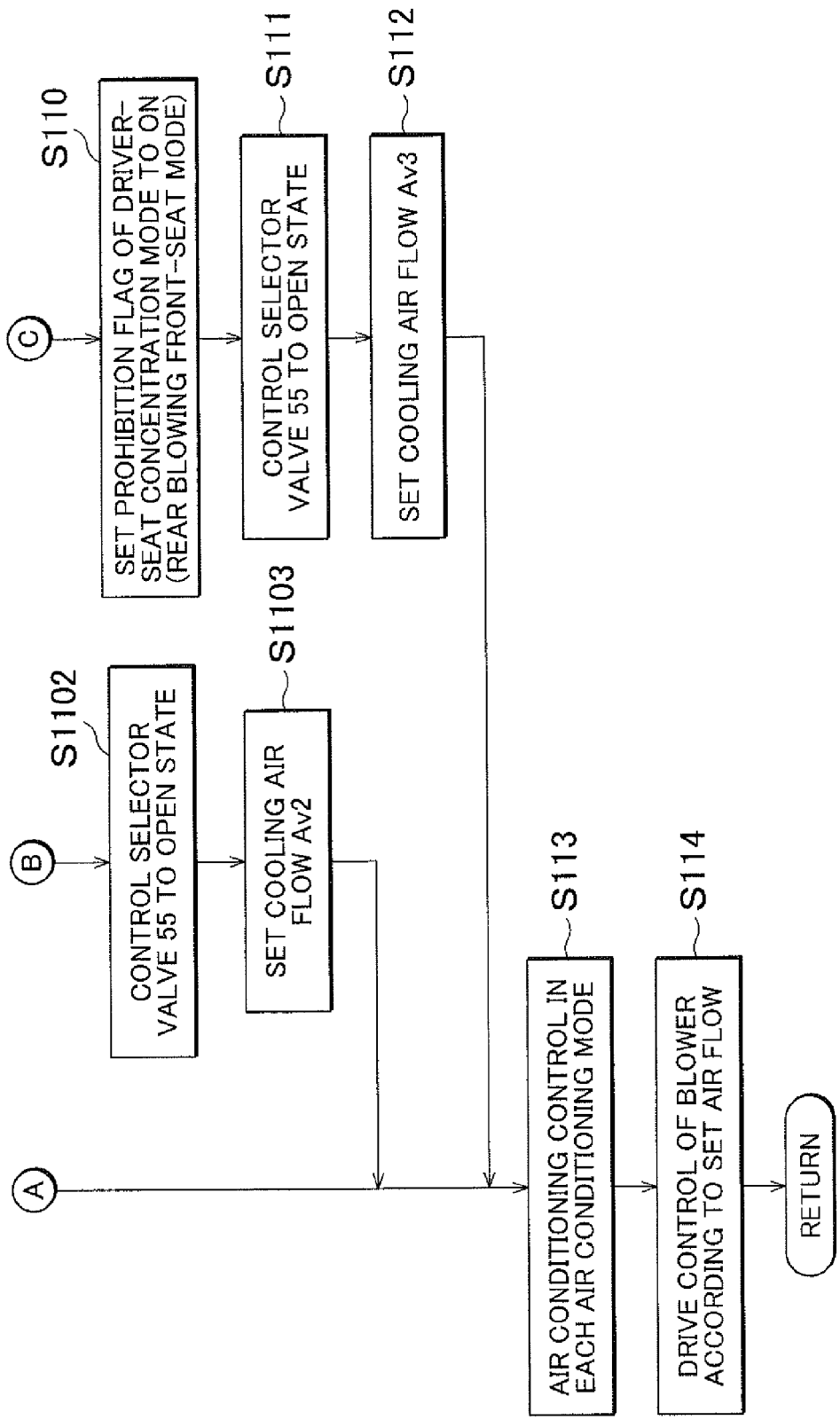

VEHICLE

INCORPORATION BY REFERENCE

The disclosure of Japanese Patent Application No. 2014-091308 filed on Apr. 25, 2014 including the specification, drawings and abstract is incorporated herein by reference in its entirety.

BACKGROUND OF THE INVENTION

1. Field of the Invention

The present invention relates to a vehicle including a battery configured to supply a power to drive a vehicle.

2. Description of Related Art

When a battery temperature increases, input-output characteristics of the battery deteriorates, which has been known well. Accordingly, a hybrid vehicle and an electric vehicle are provided with a temperature adjusting mechanism configured to cool off a battery that supplies a power to drive the vehicles. For example, by driving a blower, it is possible to guide air in a passenger compartment to the battery through an air intake duct. At this time, the air in the passenger compartment is thermoregulated by an air-conditioning device such as an air conditioner (A/C) (see Japanese Patent Application Publication No. 2012-224199 (JP 2012-224199 A), for example).

SUMMARY OF THE INVENTION

Air conditioning in the vehicle is controlled in an air conditioning mode. For example, the air conditioning mode includes the following air conditioning modes: a driver-seat concentration mode in which the air conditioning is performed only on a driver seat intensively; a front-seat mode in which the air conditioning is performed on the driver seat and a front passenger seat; an all-seat mode in which the air conditioning is performed on the driver seat, the front passenger seat, and a rear seat; and the like modes. These air conditioning modes are different in power consumption to be used for the air conditioning, and the power consumption in the all-seat mode is highest.

However, in the driver-seat concentration mode and the front-seat mode, the thermoregulated air does not reach the rear seat directly. Because of this, when an inlet port of the temperature adjusting mechanism of the battery is provided around the rear seat, a temperature (intake air temperature) of air to be supplied to the battery is hard to decrease, which may make it difficult to secure cooling performance of the battery. In the meantime, when the air conditioning is performed in the all-seat mode so as to decrease the intake air temperature and to secure the cooling performance of the battery, it is difficult to restrain a decrease in fuel efficiency, as described above.

In view of this, the present invention provides a vehicle which improves cooling efficiency of a battery by decreasing an intake air temperature of air to be taken therein through an inlet port provided around a rear seat and which is able to restrain a decrease in fuel efficiency by restraining a consumed energy used for air conditioning.

According to an aspect of the present invention, a vehicle includes a drive motor, a battery, a front seat, a rear seat, a passenger-compartment air conditioning unit, an inlet port, a blower, a temperature sensor and a controller. The battery is configured to supply a power to the drive motor. The front seat includes a driver seat. The passenger-compartment air conditioning unit is configured to supply thermoregulated air to a passenger compartment. The passenger-compartment air conditioning unit includes a plurality of blow openings and an opening and closing mechanism. The plurality of blow openings are configured to blow air to the front seat and the rear seat. The opening and closing mechanism is configured to change each of the plurality of blow openings between a first state and a second state. The first state is a state in which the air is permitted to be blown from the each of the plurality of blow openings. The second state is a state in which the air to be blown from the each of the plurality of blow openings is blocked. The inlet port is configured to take air in the passenger compartment from a space between the front seat and the rear seat. The blower is configured to supply the air taken through the inlet port to the battery. The temperature sensor is configured to detect a temperature of the battery.

The controller is configured to control the passenger-compartment air conditioning unit so as to selectively perform a first air conditioning mode, a second air conditioning mode, and a third air conditioning mode, and the controller is configured to control the passenger-compartment air conditioning unit so as to perform the third air conditioning mode when the temperature of the battery is higher than a first temperature threshold. The first air conditioning mode is a mode in which blow openings for the rear seat are set to the second state, and the air supplied from the passenger-compartment air conditioning unit is blown from the other blow openings set to the first state. The second air conditioning mode is a mode in which the air is supplied from the passenger-compartment air conditioning unit at an air flow larger than the air flow in the first air conditioning mode, and the air is blown by setting the blow openings for the rear seat to the first state as well as the other blow openings. The third air conditioning mode is a mode in which the air is blown by setting the blow openings for the rear seat which are set to the second state in the first air conditioning mode to the first state.

When air conditioning is performed in the passenger compartment in the first air conditioning mode in which the blow openings for the rear seat are blocked, thermoregulated air (e.g., cooling air) does not reach the rear seat directly. Accordingly, a temperature (intake air temperature) of the air to be supplied to the battery through the inlet port from a space between the front seat and the rear seat is hard to decrease. Because of this, cooling efficiency of the battery cannot be improved, and a temperature increase of the battery cannot be restrained.

In the meantime, when the air conditioning is performed in the passenger compartment in the second air conditioning mode in which the blow openings for the rear seat are set to a permitted state, the thermoregulated air reaches the rear seat directly. This makes it possible to decrease the intake air temperature, thereby making it possible to improve the cooling efficiency of the battery. However, in the second air conditioning mode, an air flow is larger than that of the first air conditioning mode and an output of the passenger-compartment air conditioning unit increases, so a power (energy) to be consumed increases. This decreases fuel efficiency.

In view of this, when the temperature of the battery becomes higher than the first temperature threshold, the air conditioning is not performed in the second air conditioning mode of which a consumed energy is higher than in the first air conditioning mode, but the air is controlled (the third air conditioning mode) to be blown by setting, to a permitted state, those blow openings for the rear seat which are set to a blocked state in the first air conditioning mode, so that the thermoregulated air is directly guided to the space between the front seat and the rear seat.

With such a configuration, it is possible to improve cooling efficiency (cooling performance) of the battery by decreasing the intake air temperature of the air to be taken in through the inlet port and to restrain an increase of power consumption to be used for the air conditioning. Consequently, it is possible to restrain a decrease in fuel efficiency.

In the above aspect, the first air conditioning mode may be a mode in which the air is supplied from the passenger-compartment air conditioning unit at a first air flow, and the air is blown by setting blow openings for the front seat to the first state and setting the blow openings for the rear seat to the second state. The second air conditioning mode may be a mode in which the air is supplied from the passenger-compartment air conditioning unit at a second air flow, and the air is blown by setting the blow openings for the front seat and the blow openings for the rear seat to the first state. The second air flow is larger than the first air flow. The third air conditioning mode may be a mode in which the air is blown at the first air flow by setting the blow openings for the rear seat which are set to the second state in the first air conditioning mode to the first state.

The controller may be configured to control the passenger-compartment air conditioning unit so as to perform the first air conditioning mode when the temperature of the battery is lower than the first temperature threshold, and the controller may be configured to control the passenger-compartment air conditioning unit so as to perform the third air conditioning mode when the temperature of the battery is higher than the first temperature threshold.

In the above aspect, the first air conditioning mode may include a driver-seat concentration mode and a front-seat mode. The driver-seat concentration mode may be a mode in which the air is supplied from the passenger-compartment air conditioning unit at a first air flow, and the air is blown by setting only blow openings for the driver seat to the first state. The front-seat mode may be a mode in which the air is supplied from the passenger-compartment air conditioning unit at a second air flow, and the air is blown by setting blow openings for the front seat to the first state and by setting the blow openings for the rear seat to the second state. The second air flow is larger than the first air flow. The second air conditioning mode may be a mode in which the air is supplied from the passenger-compartment air conditioning unit at a third air flow, and the air is blown by setting the blow openings for the front seat and the blow openings for the rear seat to the first state. The third air conditioning mode may be a mode in which the air is blown at the second air flow by setting the blow openings for the rear seat which are set to the second state in the front-seat mode to the first state.

The controller may be configured to control the passenger-compartment air conditioning unit so as to perform the driver-seat concentration mode when the temperature of the battery is lower than the first temperature threshold, and the controller may be configured to control the passenger-compartment air conditioning unit so as to perform the third air conditioning mode when the temperature of the battery is higher than the first temperature threshold.

In a condition that the air flow is small, it is possible to lower power consumption to be used for the air conditioning, thereby making it possible to restrain a decrease in fuel efficiency. This makes it possible to perform the air conditioning in the passenger compartment in the driver-seat concentration mode targeted only for the driver seat.

However, when the air conditioning is performed in the passenger compartment in the driver-seat concentration mode in which the air conditioning is performed on the driver seat, thermoregulated air does not reach the rear seat directly, so it is difficult to improve cooling efficiency of the battery.

In the meantime, if the air conditioning is performed in the passenger compartment in the second air conditioning mode, the fuel efficiency decreases although the thermoregulated air can be directly guided to the rear seat. Further, the front-seat mode can restrain a decrease in the fuel efficiency as compared with the second air conditioning mode. However, the thermoregulated air does not reach the rear seat directly, so it is difficult to improve the cooling efficiency of the battery.

In view of this, when the temperature of the battery becomes higher than the first temperature threshold, the air conditioning is not performed in the second air conditioning mode in which power consumption is high, but the air is controlled (the third air conditioning mode) to be blown at the second air flow by setting, to a permitted state, those blow openings for the rear seat which are set to a blocked state in the front-seat mode, so that the thermoregulated air is directly guided to the space between the front seat and the rear seat. With such a configuration, it is possible to improve the cooling efficiency of the battery by decreasing the intake air temperature of the air to be taken in through the inlet port and to restrain an increasing amount of power consumption to be used for the air conditioning as compared with a case where the temperature of the battery is lower than the first temperature threshold. Consequently, it is possible to restrain a decrease in fuel efficiency.

In the above aspect, the controller may be configured to regulate the air flow of the air to be supplied to the battery through a drive control of the blower, and the controller may be configured to perform drive control of the blower so as to supply the air to the battery at an air flow larger than an air flow set at the time when the temperature of the battery is lower than the first temperature threshold, when the temperature of the battery is higher than the first temperature threshold.

In the above aspect, the first temperature threshold may be lower than a second temperature threshold. The second temperature threshold may be a temperature to limit input and output of the battery. When the temperature of the battery increases, input-output characteristic of the battery deteriorates. Accordingly, in order to retrain the deterioration, a temperature threshold that limits an input/output power of the battery is set, and when the temperature of the battery exceeds the temperature threshold, an upper limit power of the battery is limited to be small so as to restrain the deterioration.

At this time, when the input/output power of the battery is limited to be small, the battery cannot be charged with regenerative electric power efficiently and an usable electric energy becomes small, so the fuel efficiency is decreased. Accordingly, the first temperature threshold to improve the cooling efficiency of the battery is set to be lower than a temperature threshold (the second temperature threshold) at which the input/output power is limited to be small, so that, before the input/output power is limited to be small, the intake air temperature is decreased, so as to improve the cooling efficiency of the battery. With such a configuration, it is possible to restrain a temperature increase of the battery so as not to limit the input/output power to be small, thereby making it possible to restrain a decrease in the fuel efficiency.

In the above aspect, the vehicle may further include an intake air temperature sensor. The intake air temperature sensor may be configured to detect an intake air temperature of the air to be supplied to the battery through the inlet port. The controller may be configured to control the passenger-compartment air conditioning unit so as to perform the driver-seat concentration mode when the temperature of the battery is higher than a third temperature threshold and the intake air temperature is lower than a predetermined value. Further, the controller may be configured to control the passenger-compartment air conditioning unit so as to perform the front-seat mode when the temperature of the battery is higher than the third temperature threshold and the intake air temperature is higher than the predetermined value. The third temperature threshold may be a temperature set to be lower than the first temperature threshold.

If the air flow of the air to be supplied from the passenger-compartment air conditioning unit is small, it is possible to lower power consumption to be used in air conditioning, thereby making it possible to restrain a decrease in the fuel efficiency. For this reason, it is desirable to perform the air conditioning in an air conditioning mode with a possibly low power consumption.

In view of this, even in a case where the temperature of the battery is higher than the third temperature, if the intake air temperature of the air to be supplied to the battery from the inlet port is lower than a predetermined threshold, it is determined that cooling efficiency with respect to the temperature increase of the battery is satisfied, and the driver-seat concentration mode is performed without performing the front-seat mode. With such a configuration, a control area of the driver-seat concentration mode is enlarged, so it is possible to secure the cooling efficiency of the battery and to restrain a decrease in the fuel efficiency.

In the above aspect, the first air conditioning mode may include a driver-seat concentration mode and a front-seat mode. The driver-seat concentration mode may be a mode in which the air is supplied from the passenger-compartment air conditioning unit at a first air flow, and the air is blown by setting only blow openings for the driver seat to the first state. The front-seat mode may be a mode in which the air is supplied from the passenger-compartment air conditioning unit at a second air flow, and the air is blown by setting blow openings for the front seat to the first state and by setting blow openings for the rear seat to the second state. The second air flow is larger than the first air flow. The second air conditioning mode may be a mode in which the air is supplied from the passenger-compartment air conditioning unit at a third air flow, and the air is blown by setting the blow openings for the front seat and the blow openings for the rear seat to the first state. The third air flow is larger than the second air flow. The third air conditioning mode may be a mode in which the air is blown at the first air flow by setting the blow openings for the rear seat which are set to the second state in the driver-seat concentration mode to the first state.

The controller may be configured to control the passenger-compartment air conditioning unit so as to perform the driver-seat concentration mode when the temperature of the battery is lower than the first temperature threshold. Further, the controller may be configured to control the passenger-compartment air conditioning unit so as to perform the third air conditioning mode when the temperature of the battery is higher than the first temperature threshold.

In a condition that the air flow is small, it is possible to lower power consumption to be used for the air conditioning, thereby making it possible to restrain a decrease in the fuel efficiency. This makes it possible to perform air conditioning in the passenger compartment in the driver-seat concentration mode targeted only for the driver seat.

However, when the air conditioning is performed in the passenger compartment in the driver-seat concentration mode in which the air conditioning is performed on the driver seat, the thermoregulated air does not reach the rear seat directly, so it is difficult to improve the cooling efficiency of the battery. Also, even if the air conditioning is performed in the front-seat mode, the thermoregulated air does not reach the rear seat directly and power consumption to be used in the air conditioning increases, so that fuel the efficiency decreases.

In view of this, when the temperature of the battery becomes higher than the first temperature threshold, the air conditioning is not performed in the front-seat mode and the second air conditioning mode in which power consumption is high, but the air is controlled (the third air conditioning mode) to be blown at the first air flow by setting, to a permitted state, those blow openings for the rear seat which are set to a blocked state in the drive-seat concentration mode, so that the thermoregulated air is directly guided to the space between the front seat and the rear seat. With such a configuration, it is possible to improve the cooling efficiency of the battery by decreasing the intake air temperature of the air to be taken in through the inlet port, and power consumption to be used for the air conditioning does not increase as compared with a case where the temperature of the battery is lower than the first temperature threshold. Consequently, it is possible to restrain a decrease in the fuel efficiency.

Further, in a case where the air conditioning is performed in the third air conditioning mode at the time when the temperature of the battery is higher than the first temperature threshold, when the temperature of the battery is higher than the first temperature threshold but lower than a fourth temperature threshold set higher than the first temperature threshold, the controller performs a control in the third air conditioning mode. In the meantime, when the temperature of the battery is higher than the fourth temperature threshold, the controller can perform a control in a fourth air conditioning mode in which the air is blown at the second air flow by setting, to a permitted state, those blow openings for the rear seat which are set to a blocked state in the front-seat mode.

If the air conditioning is performed in the driver-seat concentration mode, it is possible to lower power consumption to be used for air conditioning. On that account, the air conditioning is performed in the driver-seat concentration mode if possible so as to restrain a decrease in the fuel efficiency. However, since the air flow in the driver-seat concentration mode is smaller than the air flows in the front-seat mode and the second air conditioning mode, even if the blow openings for the rear seat are controlled to a permitted state while the driver-seat concentration mode is performed (the third air conditioning mode), the cooling performance to a temperature increase of the battery may not be satisfied.

In the above aspect, the controller may be configured to control the passenger-compartment air conditioning unit so as to selectively perform a fourth air conditioning mode. The fourth air conditioning mode may be a mode in which the air is blown at the second air flow by setting the blow openings for the rear seat which are set to the second state in the front-seat mode to the first state. The controller may be configured to control the passenger-compartment air conditioning unit so as to perform the third air conditioning mode when the temperature of the battery is higher than the first temperature threshold and the temperature of the battery is lower than a fourth temperature threshold, and the controller may be configured to control the passenger-compartment air conditioning unit so as to perform the fourth air conditioning mode when the temperature of the battery is higher than the fourth temperature threshold. The fourth temperature threshold is set higher than the first temperature threshold. With such a configuration, it is possible to further improve the cooling efficiency of the battery and to restrain an increasing amount of power consumption to be used for the air conditioning as compared with a case where the temperature of the battery is lower than the fourth temperature threshold. Consequently, it is possible to restrain a decrease in the fuel efficiency.

In the above aspect, the vehicle may include an intake temperature sensor. The intake temperature sensor may be configured to detect an intake air temperature of the air supplied to the battery through the inlet port. The controller may be configured to control the passenger-compartment air conditioning unit so as to perform the driver-seat concentration mode when the temperature of the battery is higher than the first temperature threshold and the intake air temperature is lower than a predetermined value. Further, the controller controls the passenger-compartment air conditioning unit so as to perform the third air conditioning mode when the temperature of the battery is higher than the first temperature threshold and the intake air temperature is higher than the predetermined value.

Since the air flow in the driver-seat concentration mode is smaller than the air flows in the front-seat mode and the second air conditioning mode, if the blow openings for the rear seat are controlled to a permitted state while the driver-seat concentration mode is performed, an air flow of the air to be blown from the blow openings for the driver seat is reduced.

In view of this, even in a case where the temperature of the battery is higher than the first temperature threshold, if the intake air temperature of the air to be supplied to the battery from the inlet port is lower than the predetermined value, it is determined that the cooling efficiency of the battery with respect to the temperature increase of the battery is satisfied, and the driver-seat concentration mode is performed without performing the third air conditioning mode to set the blow openings for the rear seat to a permitted state. With such a configuration, it is possible to restrain a decrease in an amount of the air blown from the blow openings for the driver seat.

In the above aspect, the blow openings for the rear seat may be provided below the driver seat and below the front passenger seat, respectively, so as to blow the air into the space. The front passenger seat and the driver seat constitute the front seat. The inlet port and an exhaust port may be provided below the rear seat so as to correspond to the blow openings for the rear seat, respectively. The exhaust port may exhaust the air to be supplied to the battery into the passenger compartment.

In the limited space in the passenger compartment, it is possible to provide the inlet port and the exhaust port of the temperature adjusting mechanism of the battery below the rear seat. At this time, in the space between the front seat and the rear seat, the inlet port and the exhaust port can be provided so as to correspond to those blow openings for the rear seat which are provided below the driver seat and the front passenger seat. With such a configuration, it is possible to directly take, from the inlet port, the thermoregulated air, thereby making it possible to improve the cooling efficiency of the battery. Further, the air exhausted from the exhaust port is the air that has performed heat exchange with the battery that generates heat by charge and discharge. Accordingly, when the thermoregulated air is blow from the blow opening corresponding to the exhaust port, a temperature (exhaust heat temperature) of the air after the heat exchange with the battery can be decreased.

BRIEF DESCRIPTION OF THE DRAWINGS

Features, advantages, and technical and industrial significance of exemplary embodiments of the invention will be described below with reference to the accompanying drawings, in which like numerals denote like elements, and characterized in that:

FIG. 3 is a block diagram of a schematic configuration of the vehicle in Embodiment 1;

FIG. 4 is a view of Embodiment 1 illustrating: in an upper part, a relationship between a battery temperature and an intake air temperature for each air conditioning mode of the passenger-compartment air conditioning unit; in a middle part, a relationship between an upper limit power and a battery temperature of the battery; and in a lower part, a relationship between an air flow to be supplied to the battery and the battery temperature;

FIG. 5B is a view illustrating a process flow of the vehicle, including a control of the passenger-compartment air conditioning unit in Embodiment 1;

FIG. 7B is a view illustrating a process flow of a vehicle, including a control of the passenger-compartment air conditioning unit in Embodiment 2.

DETAILED DESCRIPTION OF EMBODIMENTS

The following describes embodiments of the present invention.

Figure 1:
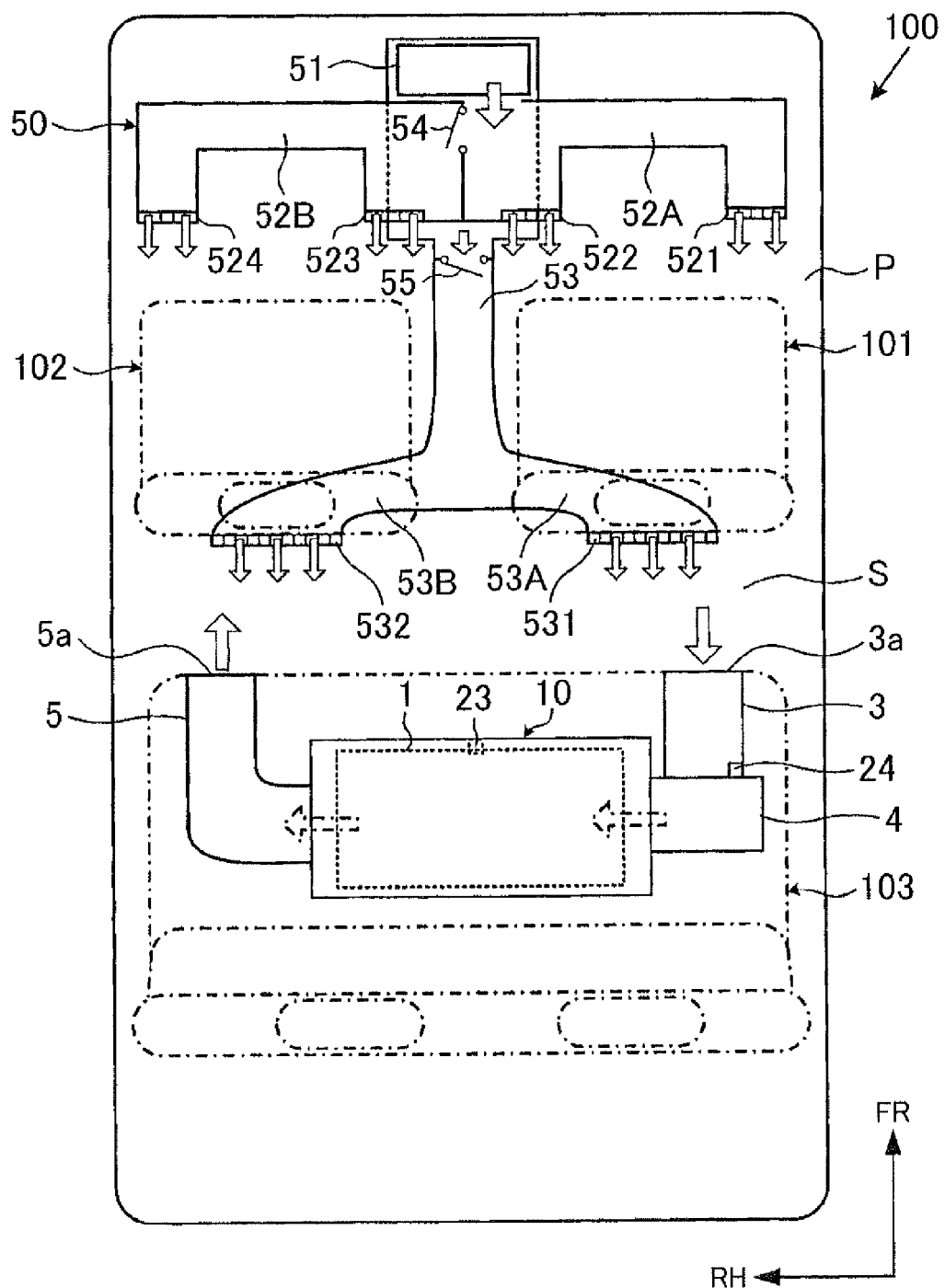
FIG. 1 is a schematic view of a vehicle according to Embodiment 1.

FIGS. 1 to 5A and 5B are views each illustrating Embodiment 1 of the present invention. FIG. 1 is a schematic diagram of a vehicle. In FIG. 1 and so on, an arrow FR indicates a forward direction of a vehicle 100, and an arrow RH indicates a lateral (width) direction perpendicular to the forward direction FR of the vehicle 100. An arrow UP indicates an upper direction of the vehicle 100.

Seats 101, 102, 103 are placed in a passenger compartment of the vehicle 100. The passenger compartment is a space where an occupant gets in. The seats 101, 102 are a driver seat and a front passenger seat, for example. The seats 101, 102 constitutes a front seat of the vehicle 100, and the seat 103 placed behind the front seat is a rear seat. Note that a positional relationship between the drive seat and the front passenger seat that constitute the front seat may be reverse to the above.

The seats 101, 102, 103 are fixed to a floor panel P of the vehicle 100. A battery pack 10 is placed in a space formed below the seat 103, and fixed to the floor panel P. That is, the battery pack 10 is placed between a seat cushion (a seat) of the seat 103 and the floor panel P.

Note that the present embodiment exemplifies an aspect in which the battery pack 10 is placed below the seat 103. However, the battery pack 10 can be placed in a luggage space placed behind the seat 103.

The battery pack 10 outputs an energy to be used to drive the vehicle 100. The vehicle 100 may be a hybrid vehicle or an electric vehicle. The hybrid vehicle is a vehicle including another power source such as a fuel cell or an internal combustion engine as a power source to drive the vehicle 100, as well as the battery pack 10. The electric vehicle is a vehicle including only the battery pack 10 as a power source of the vehicle 100.

The battery pack 10 includes a battery outer case configured to accommodate therein an assembled battery (corresponding to a battery) 1 configured to perform charge and discharge. The battery outer ease can be constituted by an upper case and a lower case, and the assembled battery 1 is placed in a space surrounded by the battery outer case. A space is formed between the assembled battery 1 and the battery outer case, so that a circulation space of air performing heat exchange with the assembled battery 1 is provided therein. The battery outer case is fixed to the floor panel P of the vehicle 100 directly or indirectly via a bracket or the like, so that the battery pack 10 is provided in the vehicle 100.

The battery pack 10 is provided with a temperature adjusting mechanism for temperature adjustment of the assembled battery 1. The temperature adjusting mechanism includes: an inlet port 3*a* through which air in the passenger compartment is taken in from the space S between the front seat (the seat 101, 102) and the rear seat (the seat 103); an air intake duct 3 extending from the inlet port 3*a* to the battery pack 10; and a blower 4 configured to supply, to the battery pack 10, that air in the passenger compartment which is taken in through the inlet port 3*a*.

Further, the temperature adjusting mechanism can be constituted by father including an exhaust duct 5 constituting an exhaust passage of the air exhausted from the battery pack 10 after heat exchange with the assembled battery 1 in the battery pack 10; and an exhaust port 5*a* connected to the exhaust duct 5.

The inlet port 3*a* and the exhaust port 5*a* can be provided around the rear seat. For example, the inlet port 3*a* and the exhaust port 5*a* can be provided below the rear seat so as to be separated from each other in a direction of the arrow RH. In the example of FIG. 1, an opening of the inlet port 3*a* is provided below the rear seat so as to face the after-mentioned blow opening 531, and an opening of the exhaust port 5*a* is provided below the rear seat so as to face the after-mentioned blow opening 532.

The battery pack 10, the air intake duct 3 constituting the temperature adjusting mechanism, the blower 4, and the exhaust duct 5 are placed in the space below the rear seat, and the inlet port 3*a* and the exhaust port 5*a* are placed so as to face the space S to take the air in the passenger compartment therein.

Note that a configuration of the temperature adjusting mechanism of the battery pack 10 can be set appropriately. For example, the blower 4 can be provided on an exhaust-duct-5 side. Further, an outlet of the blower 4 may be directly connected to the battery pack 10, or may be connected thereto via an intermediate duct or the like. Further, the exhaust port 5*a* can be provided in the luggage space behind the rear seat. The exhaust duct 5 may be extended, so that the air discharged from the battery pack 10 can be exhausted into the luggage space.

That air in the passenger compartment which is taken in through the inlet port 3*a* is supplied to the battery pack 10 through the air intake duct 3 and the blower 4. The air thus supplied to the battery pack 10 enters into a top face, a bottom face, and side surfaces of the assembled battery 1 and/or a space between single cells 2 constituting the assembled battery 1, and moves toward the exhaust duct 5 (the exhaust port 5*a*).

Here, the air makes contact with external surfaces of the single cells 2, and heat exchange is performed between the air and the single cells 2. The single cells 2 generate heat by charge and discharge, and the like. In view of this, when the air for cooling makes contact with the single cells 2, a temperature increase of the single cells 2 can be restrained. The air after the heat exchange with the assembled battery 1 returns to the passenger compartment from the exhaust port 5*a*.

The air in the passenger compartment has a temperature suitable for cooling the assembled battery 1 (the single cells 2), due to the after-mentioned passenger-compartment air conditioning unit 50. Accordingly, the assembled battery 1 can be cooled off by supplying the air in the passenger compartment to the assembled battery 1. By performing thermoregulation, it is possible to restrain input-output characteristics of the assembled battery 1 from deteriorating.

The vehicle 100 of the present embodiment includes the passenger-compartment air conditioning unit 50. The passenger-compartment air conditioning unit 50 includes a HVAC unit 51 configured to supply cooled or heated air (thermoregulated air), and a plurality of blow openings provided in respective ends of passages extending from the HVAC unit 51. Note that the passenger-compartment air conditioning unit 50 can perform air conditioning of internal air circulation (the air is taken in from an internal air intake opening and circulated in the passenger compartment without taking the external air therein) and/or external air circulation (the external nal air is taken in from an external air intake opening and supplied to the passenger compartment).

The plurality of blow openings includes: blow openings 521, 522 provided in a driver-seat air conditioning passage 52A extended from the HVAC unit 51, so as to be placed in front of the driver seat to face the driver seat; and blow openings 523, 524 provided in a front-passenger-seat air conditioning passage 52B so as to be placed in front of the front passenger seat to face the front passenger seat.

Further, as blow openings of the passenger-compartment air conditioning unit 50, a blow opening 531 provided in a rear-seat air conditioning passage 53A so as to be placed below the driver seat and in front of the rear seat, and a blow opening 532 provided in a rear-seat air conditioning passage 53B so as to be placed below the front passenger seat and in front of the rear seat are provided.

The rear-seat air conditioning passages 53A, 53B are extended toward the rear seat from the HVAC unit 51, and serve as branch passages of the air conditioning passage 53 placed in a space between the driver seat and the front passenger seat. The rear-seat air conditioning passages 53A, 53B are extended from the air conditioning passage 53 toward back surfaces of the driver seat and the front passenger seat in a direction of the arrow RH.

The blow openings 531, 532 face the rear seat, and are configured to supply thermoregulated air into the space S. At this time, the blow openings 531, 532 are provided at positions opposed to the inlet port 3*a* and the exhaust port 5*a* of the battery pack 10 in the space S. In other words, the inlet port 3*a* is provided at a position corresponding to the blow opening 531 provided below the driver seat on its back side and faces the space S. Further, the exhaust port 5*a* is provided at a position corresponding to the blow opening 532 provided below the front passenger seat on its back side and faces the space S.

Figure 2:
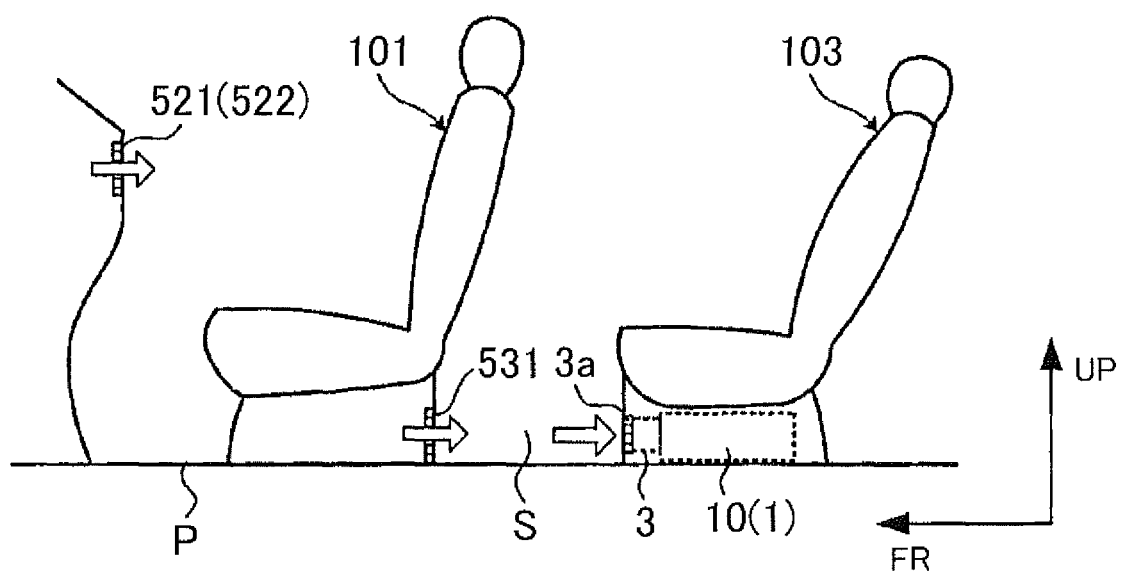
FIG. 2 is a view illustrating a positional relationship between a blowing opening of a passenger-compartment air conditioning unit and an inlet port of a temperature adjusting mechanism of a battery in Embodiment 1.

FIG. 2 is a view illustrating a positional relationship between the blow opening 521 for the driver seat in the passenger-compartment air conditioning unit 50, the blow opening 531 for the rear seat in the passenger-compartment air conditioning unit 50, and the inlet port 3*a* of the temperature adjusting mechanism of the battery pack 10. As illustrated in FIG. 2, the blow opening 521 (522) is provided on a front side relative to the driver seat, so as to blow the thermoregulated air toward the driver seat. Further, the blow opening 531 is provided below the driver seat on the rear side of the driver seat, so that the air thermoregulated by the HVAC unit 51 is supplied from the blow opening 531 into the space S. The inlet port 3a can take therein the air thus blown from the blow opening 531 into the space S.

The passenger-compartment air conditioning unit 50 includes switching means configured to change a permitted state in which the air is permitted to be blown from each blow opening to a blocked state in which the air is blocked, and vice versa. As the switching means, selector valves 54, 55 configured to change air conditioning passages. The selector valve 54 sections the driver-seat air conditioning passage 52A from the front-passenger-seat air conditioning passage 52B.

If the selector valve 54 is in a closed state, the air supplied from the HVAC unit 51 can be circulated only through the driver-seat air conditioning passage 52A, thereby causing a permitted state in which the air is permitted to be blown only from the blow openings 521, 522. Further, if the selector valve 54 is in an open state, the air supplied from the HVAC unit 51 can be circulated through the driver-seat air conditioning passage 52A and the front-passenger-seat air conditioning passage 52B, thereby causing a permitted state in which the air is permitted to be blown from the blow openings 521, 522 and the blow openings 523, 524.

The selector valve 55 sections the driver-seat air conditioning passage 52A and the front-passenger-seat air conditioning passage 52B from the rear-seat air conditioning passages 53A, 53B. If the selector valve 55 is in an open state, the air supplied from the HVAC unit 51 can be circulated through the rear-seat air conditioning passages 53A, 53B, thereby causing a permitted state in which the air is permitted to be blown from the blow openings 531, 532. If the selector valve 55 is in a closed state, the air supplied from the HVAC unit 51 cannot be circulated through the rear-seat air conditioning passages 53A, 53B, thereby causing a blocked state in which the air is blocked so as not to be blown from the blow openings 531, 532.

Note that the present embodiment exemplifies an aspect in which the selector valves 54, 55 are provided on the air conditioning passages as switching means, but the present embodiment is not limited to this. For example, a louver (an opening and closing mechanism) is provided in each blow opening, so as to change the each blow opening between an open state and a closed state, thereby permitting or blocking the blowing of the air from the each blow opening of the passenger-compartment air conditioning unit 50.

Further, the air supplied from the HVAC unit 51 may be circulated through either one of the rear-seat air conditioning passages 53A, 53B. For example, a selector valve may be further provided in an area where the air conditioning passage 53 is branched into the rear-seat air conditioning passages 53A, 53B, or either one of the blow openings 531, 532 may be set to a closed state in the configuration in which the louver is provided in each blow opening. This makes it possible to circulate the air through either one of the rear-seat air conditioning passages 53A, 53B.

Next will be described an air conditioning mode of the passenger-compartment air conditioning unit 50 of the present embodiment. The passenger-compartment air conditioning unit 50 changes each blow opening between a permitted state and a blocked state, and performs air flow adjustment on the air supplied from the HVAC unit 51. The passenger-compartment air conditioning unit 50 controls a blow opening to blow the air therethrough, and controls an air flow to supply the air from the HVAC unit 51 so as to blow the air from each blow opening. Hereby, the passenger-compartment air conditioning unit 50 can perform air conditioning in each of a driver-seat concentration mode, a front-seat mode, and an all-seat mode (corresponding to a second air conditioning mode). The control of each of the air conditioning modes is executed by the after-mentioned air-conditioning control device 32 (a vehicle control device 30).

The driver-seat concentration mode is an air-conditioning mode in which a smallest first air flow is set, the selector valves 54, 55 are both controlled to a closed state, and only the blow openings 521, 522 for the driver seat are controlled to a permitted state. In the driver-seat concentration mode, the air is supplied at the first air flow from the HVAC unit 51, and the blow openings 523, 524, 531, 532 other than the blow openings 521, 522, are controlled to a blocked state, so that the air is blown from the blow openings 521, 522.

The front-seat mode is an air-conditioning mode in which a second air flow higher than that of the driver-seat concentration mode is set, the selector valve 54 is set to an open state, and the blow openings 521, 522 for the driver seat and the blow openings 523, 524 for the front passenger seat are controlled to a permitted state. In the front-seat mode, the air is supplied at the second air flow from the HVAC unit 51, and the blow openings 531, 532 for the rear seat are controlled to a blocked state, so that the air is blown from the other blow openings 521, 522, 523, 524. The driver-seat concentration mode and the front-seat mode are an air-conditioning mode in which the selector valve 55 is controlled to a closed state, and the air is blown from the blow openings 521, 522, and/or the blow openings 523, 524 except the blow openings 531, 532 for the rear seat.

The all-seat mode is an air-conditioning mode in which a third air flow higher than that of the front-seat mode is set, the selector valves 54, 55 are both controlled to an open state, and the blow openings 531, 532 for the rear seat are controlled to a permitted state. In the all-seat mode, the air is supplied at the third air flow from the HVAC unit 51, and the blow openings 531, 532 for the rear seat and the other blow openings including the blow openings 521, 522 for the driver seat and the blow openings 523, 524 for the front passenger seat are controlled to a permitted state, so that the air is blown from all the blow openings.

As described above, even if an air-conditioning temperature is the same, these air-conditioning modes are controlled to have different air flows of the air to be supplied from the HVAC unit 51. That is, their respective power consumptions (consumed energies) to be used in the air conditioning are different from each other. In the driver-seat concentration mode, the air conditioning is performed only on the driver seat, so the smallest first air flow is set and power consumption to be used in the air conditioning is small. Then, in the front-seat mode, the air conditioning is performed on the front seat including the driver seat and the front passenger seat, so the second air flow, which is larger than in a case where the air conditioning is performed only on the driver seat, is set, and power consumption to be used in the air conditioning is larger than that of the driver-seat concentration mode.

Then, in the all-seat mode, the air conditioning is performed on the front seat including the driver seat and the front passenger seat, and the rear seat, so the third air flow, which is further larger than in a case where the air conditioning is performed on the front seat, is set, and power consumption to be used in the air conditioning is larger than that of the front-seat mode. As such, the air flows of the driver-seat concentration mode, the front-seat mode, and the all-seat mode are sequentially increased in this order, so that the driver-seat concentration mode has the smallest power consumption and a high fuel efficiency. The all-seat mode has the highest power consumption and a low fuel efficiency.

The air conditioning by the passenger-compartment air conditioning unit 50 can be performed such that a user in the vehicle 100 sets an air conditioning mode, or performed such that an air conditioning mode is automatically set according to a detected temperature in the passenger compartment or a detected result of a sitting sensor in each seat, for example. However, in the present embodiment, from the viewpoint of cooling efficiency of the assembled battery 1, the passenger-compartment air conditioning unit 50 is controlled based on a temperature (a battery temperature) of the assembled battery 1.

FIG. 3 is a block diagram illustrating a schematic configuration of the vehicle 100. The assembled battery 1 is configured such that a plurality of single cells 2 is connected in series to each other. As the single cell 2, a secondary battery such as a nickel metal hydride battery or a lithium-ion battery can be used.

The assembled battery 1 is connected to an inverter 6, and a power is supplied to a motor generator (MG) 7 via the inverter 6. The motor generator 7 is a drive motor of the vehicle 100 (e.g., a three-phase alternating motor), and operates by receiving an alternating-current power output from the inverter 6. Further, the motor generator 7 converts a kinetic energy generated at the time of braking of the vehicle 100, into an electrical energy (alternating-current power), and the inverter 6 outputs regenerative electric power to the assembled battery 1. The after-mentioned battery control device 31 controls each of these members so as to control charging and discharging operations of the assembled battery 1.

A voltage sensor 21 detects a voltage value of the assembled battery 1 and a voltage value of each single cell 2, and outputs a detected result to the battery control device 31. A current sensor 22 detects a current value flowing through the assembled battery 1, and outputs a detected result to the battery control device 31. A temperature sensor 23 detects a temperature of the assembled battery 1 (single cell 2), and outputs a detected result to the battery control device 31.

A temperature sensor 24 (corresponding to an intake air temperature sensor) detects an intake air temperature of the air to be supplied to the battery pack 10, and outputs a detected result to the battery control device 31. The temperature sensor 24 can be provided in the air intake duct 3, for example. Note that the temperature sensor 24 can be provided at any position on an intake passage constituted by the inlet port 3a, the air intake duct 3, and the blower 4, provided that a temperature of the air to be supplied to the battery pack 10 (the air before heat exchange with the assembled battery 1) can be detected at the position.

The battery control device 31 is a battery ECU configured to manage an SOC and a degraded state of the assembled battery 1 by use of the detected result of each sensor, and to control charging and discharging operations of the assembled battery 1 based on a battery control signal from the vehicle control device 30. Further, the battery control device 31 performs a drive control of the blower 4, and performs a temperature adjustment control of the assembled battery 1.

The air-conditioning control device 32 performs a drive control of the HVAC unit 51 of the passenger-compartment air conditioning unit 50 and a switching control of the selector valves 54, 55 based on an air-conditioning control signal from the vehicle control device 30. The HVAC unit 51 includes an air blower 511 such as a fan, a cooling device 512 (e.g., an evaporator) placed in a downstream of the air blower 511, and a heating device 513 (e.g., a heater core).

For example, the air-conditioning control device 32 drives the cooling device 512 or the heating device 513 based on a preset temperature, controls an output of the air blower 511 so as to send the air at a predetermined air flow according to each of the above air conditioning modes, and performs a switching control on the selector valves 54, 55 according to the each of the air conditioning modes. Note that the passenger-compartment air conditioning unit 50 can operate by a power supplied from the assembled battery 1 and an auxiliary battery (not shown).

The vehicle control device 30 is a main controller configured to control the whole vehicle. The vehicle control device 30 calculates a vehicle request output requested to the whole vehicle 100, and performs an input-output control on the assembled battery 1 based on the vehicle request output. In the hybrid vehicle including an engine, the vehicle control device 30 performs an output control on an engine and an input-output control on the assembled battery 1 according to the vehicle request output. The vehicle request output includes a power necessary for the air conditioning, as well as a power to be output to the motor generator 7 as a drive motor of the vehicle 100.

Note that respective control devices including the vehicle control device 30, the battery control device 31, and the air-conditioning control device 32 can be constituted by a single control device. Further, each of the control devices can include a memory (not shown). One or more memories can be provided for a plurality of control devices. The memory is provided in the control device or externally attached to the control device.

FIG. 4 is a view illustrating: a relationship between a battery temperature Tb and an intake air temperature α for each air conditioning mode of the passenger-compartment air conditioning unit 50 (in an upper part); a relationship between an upper limit power of the assembled battery 1 and the battery temperature Tb (in a middle part); and a relationship between an air flow to be supplied to the assembled battery 1 and the battery temperature Tb (in a lower part).

As illustrated in the upper part of FIG. 4, each of the air conditioning modes of the passenger-compartment air conditioning unit 50 can be controlled according to the battery temperature Tb of the assembled battery 1. If the battery temperature Tb is lower than a temperature A, the driver-seat concentration mode is performed, and if the battery temperature Tb is larger than the temperature A but lower than the temperature B, the front-seat mode is performed.

However, when the air conditioning is performed in the passenger compartment in the driver-seat concentration mode or the front-seat mode in which the blow openings 531, 532 for the rear seat are blocked, cooling air does not reach the rear seat directly. Accordingly, the temperature (intake air temperature) of the air to be supplied to the assembled battery 1 through the inlet port 3a from the space S between the front seat and the rear seat is hard to decrease.

In the meantime, when air conditioning is performed in the passenger compartment in the all-seat mode in which the blow openings 531, 532 are set to a permitted state, cooling air is directly guided to the rear seat. However, in the all-seat mode, the air flow is larger than that of the driver-seat concentration mode or the front-seat mode, so the output of the passenger-compartment air conditioning unit 50 increases. As a result, a power to be consumed increases and fuel efficiency decreases.

In view of this, in the present embodiment, as illustrated in FIG. 4, when the battery temperature Tb becomes higher than the temperature B, the air conditioning is performed not in the all-seat mode in which power consumption is high, but in a rear blowing front-seat mode (corresponding to a third air conditioning mode) in which those blow openings 531, 532 for the rear seat which are in a blocked state in the front-seat mode are set to a permitted state and the air is blown at the same air flow as the front-seat mode. By controlling, to a permitted state, those blow openings 531, 532 for the rear seat which are in a blocked state while the front-seat mode is performed, it is possible to guide thermoregulated cooling air directly to the space S between the front seat and the rear seat.

More specifically, when the battery temperature Tb is lower than the temperature B, the vehicle control device 30 (the air-conditioning control device 32) controls to perform the front-seat mode, and when the battery temperature Tb is higher than the temperature B, the vehicle control device 30 controls to perform the rear blowing front-seat mode to set the blow openings 531, 532 to a permitted state while performing the front seat mode. With such a configuration, the intake air temperature of the air taken in from the space S through the inlet port 3a can be decreased directly, thereby making it possible to improve cooling efficiency of the assembled battery 1. At this time, the air conditioning mode performed when the battery temperature Tb is lower than the temperature B and the air conditioning mode performed when the battery temperature Tb is higher than the temperature B have the same air flow of the air to be supplied from the HVAC unit 51. Accordingly, power consumption to be used in the air conditioning does not increase, thereby making it possible to restrain a decrease in the fuel efficiency.

Further, when the battery temperature Tb is lower than the temperature B, the vehicle control device 30 controls to perform the driver-seat concentration mode, and when the battery temperature Tb is higher than the temperature B, the vehicle control device 30 controls to perform the rear blowing front-seat mode.

As described above, when the air conditioning is performed in the passenger compartment in the driver-seat concentration mode in which the air conditioning is performed on the driver seat, the thermoregulated air does not reach the rear seat directly, so it is difficult to improve the cooling efficiency of the assembled battery 1. If the all-seat mode is performed, the fuel efficiency is decreased. Further, even if the air conditioning is performed in the front-seat mode that can restrain a decrease in the fuel efficiency in comparison with the all-seat mode, the thermoregulated air does not reach the rear seat directly, so it is difficult to improve the cooling efficiency of the assembled battery 1.

In view of this, when the battery temperature Tb becomes higher than the temperature B, the air conditioning is performed not in the all-seat mode in which power consumption is high, but in the rear blowing front-seat mode, so as to guide the thermoregulated cooling air directly to the space S between the front seat and the rear seat. With such a configuration, it is possible to improve the cooling efficiency of the assembled battery 1 by decreasing the intake air temperature of the air to be taken in through the inlet port 3a. At this time, it is possible to restrain an increasing amount of the power consumption to be used in the air conditioning relative to a case where the battery temperature Tb is lower than the temperature B. That is, a case where the driver-seat concentration mode is changed to the rear blowing front-seat mode having the same power consumption as the front-seat mode can reduce an increasing amount of the power consumption and restrain a decrease in the fuel efficiency, in comparison with a case where the driver-seat concentration mode is changed to the all-seat mode.

Here, the following describes the temperature B as a temperature threshold. When the battery temperature Tb increases, input-output characteristics of the assembled battery 1 deteriorates. In order to retrain the deterioration, a temperature C that limits an input/output power of the assembled battery 1 is set as illustrated in the middle part of FIG. 4, and when the battery temperature Tb exceeds the temperature C, an upper limit power W_Max of the assembled battery 1 is limited to be small so as to restrain the deterioration.

Accordingly, when the input/output power of the assembled battery 1 is limited to be small, the assembled battery 1 cannot be charged with regenerative electric power efficiently and an usable electric energy is reduced, so the fuel efficiency is decreased. In view of this, the temperature B is set to be lower than the temperature C at which the input/output power is limited to be small, and before the input/output power is limited to be small, the intake air temperature $\alpha$ is decreased, so as to improve the cooling efficiency of the assembled battery 1. This makes it possible to restrain a temperature increase of the assembled battery 1 so as not to limit the input/output power to be small, thereby making it possible to restrain a decrease in the fuel efficiency.

Further, in order to improve the cooling efficiency of the assembled battery 1, the vehicle control device 30 (the battery control device 31) can perform drive control of the blower 4 so as to increase an air flow of the air (cooling air) to be supplied to the assembled battery 1 (battery pack 10).

As illustrated in the lower part of FIG. 4, when the battery temperature Tb is higher than the temperature B, the vehicle control device 30 controls the blower 4 so as to supply the air to the assembled battery 1 at an air flow that is larger than an air flow at the time when the battery temperature Tb is lower than the temperature B. For example, the vehicle control device 30 can control the blower 4 to increase a cooling air flow by increasing a rotation number of the blower 4. The air flow to be increased can be set appropriately.

Further, as illustrated in the example of FIG. 4, when the battery temperature Tb is higher than the temperature A, the vehicle control device 30 can control the blower 4 to supply the air to the assembled battery 1 at an air flow that is larger than an air flow at the time when the battery temperature Tb is lower than the temperature A, and further, along with an increase of the battery temperature Tb, the vehicle control device 30 can control the blower 4 to increase the air flow of the air to be supplied from the blower 4.

With such a configuration, when the battery temperature Tb is higher than the temperature B, it is possible to improve the cooling efficiency of the assembled battery 1 by decreasing the intake air temperature $\alpha$ of the air to be taken in through the inlet port 3a, and to further improve the cooling efficiency by further increasing a supply amount of the air to be supplied to the assembled battery 1.

Note that, in the example of FIG. 4, in the relationship with the battery temperature Tb with respect to each air conditioning mode of the passenger-compartment air conditioning unit 50, as illustrated in the upper part of FIG. 4, even in a case where the battery temperature Tb exceeds the temperature A, if the intake air temperature $\alpha$ is lower than a threshold $\alpha\_th$, the air conditioning can be performed not in the front-seat mode, but in the driver-seat concentration mode. The front-seat mode is performed at the time when the battery temperature Tb is higher than the temperature A and the intake air temperature $\alpha$ is higher than the threshold $\alpha\_th$.

As described above, if the air flow is small, it is possible to lower power consumption to be used in the air conditioning, thereby making it possible to restrain a decrease in the fuel efficiency. Because of this, even if the air conditioning is performed, it is desirable to perform the air conditioning in an air conditioning mode with a low power consumption.

In view of this, in the present embodiment, in consideration of the intake air temperature α in addition to the battery temperature Tb, a control area of the driver-seat concentration mode is enlarged, and a control area of the front-seat mode is reduced. That is even in a case where the battery temperature Tb is higher than the temperature A, if the intake air temperature α of the air to be supplied to the battery from the inlet port 3a is lower than the threshold α_th, it is determined that the cooling efficiency to the temperature increase of the assembled battery 1 is satisfied, and the driver-seat concentration mode is performed without performing the front-seat mode. With such a configuration, it is possible to secure the cooling efficiency of the battery and to restrain a decrease in the fuel efficiency.

Figure 5A:
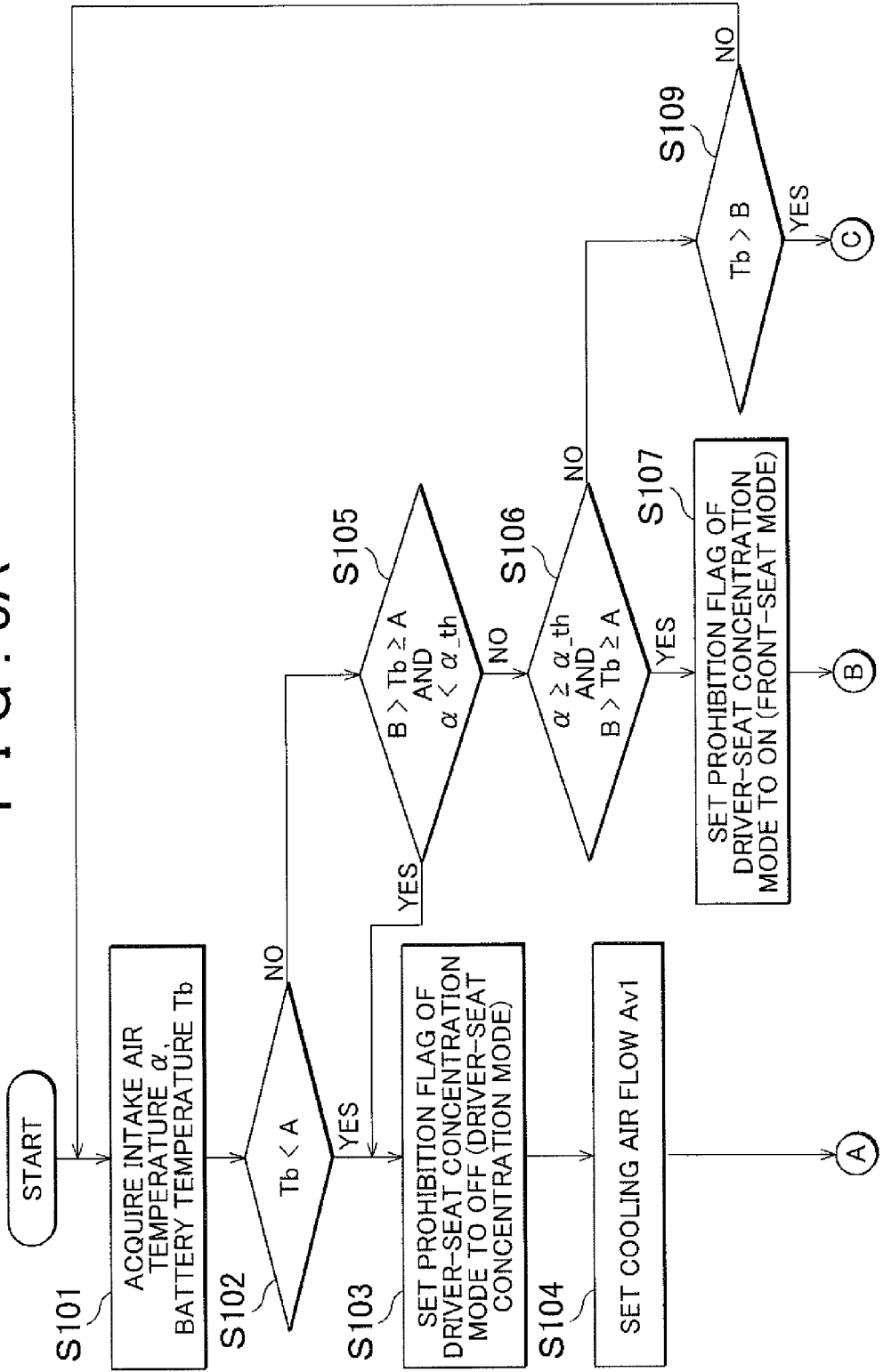
FIG. 5A is a view illustrating a process flow of the vehicle, including a control of the passenger-compartment air conditioning unit in Embodiment 1.

FIG. 5A and FIG. 5B are a view illustrating a process flow of the vehicle 100, including the control of the passenger-compartment air conditioning unit 50 of the present embodiment. The control is performed during vehicle running or during vehicle stop in a state where a battery system is activated.

As illustrated in FIG. 5A and FIG. 5B, the vehicle control device 30 acquires a battery temperature Tb of the assembled battery 1 from the temperature sensor 23, and acquires an intake air temperature α from the temperature sensor 24 (S101).

The vehicle control device 30 determines whether or not the battery temperature Tb is lower than the temperature A (S102). When the battery temperature Tb is lower than the temperature A, the vehicle control device 30 sets a prohibition flag of the driver-seat concentration mode to OFF, and outputs a control signal to the air-conditioning control device 32 so as to perform air conditioning in the driver-seat concentration mode (S103). Further, the vehicle control device 30 sets an air flow of the air to be supplied to the assembled battery 1 to an air flow Av1, so as to output, to the battery control device 31, a control signal to drive the blower 4 at the air flow Av1 (S104).

The air-conditioning control device 32 performs an air-conditioning control in the driver-seat concentration mode (S113), and the battery control device 31 drives the blower 4 at a rotation number corresponding to the air flow Av1 (S114).

When it is determined that the battery temperature Tb is higher than the temperature A in step S102, the vehicle control device 30 proceeds to step S105 to determine whether or not the battery temperature Tb is lower than temperature B and the intake air temperature α is lower than the threshold α_th.

When the battery temperature Tb is lower than temperature B and the intake air temperature α is lower than the threshold α_th, the vehicle control device 30 proceeds to step S103 to perform the air-conditioning control in the driver-seat concentration mode, and the battery control device 31 drives the blower 4 at a rotation number corresponding to the air flow Av1.

When it is determined that the battery temperature Tb is lower than temperature B, but the intake air temperature α is not lower than the threshold α_th in step S105, the vehicle control device 30 proceeds to step S106 to determine whether or not the battery temperature Tb is lower than the temperature B and the intake air temperature α is higher than the threshold α_th. When the battery temperature Tb is lower than temperature B and the intake air temperature α is higher than the threshold α_th, the vehicle control device 30 sets the prohibition flag of the driver-seat concentration mode to ON, and outputs a control signal to the air-conditioning control device 32 so as to perform the air conditioning in the front-seat mode (S107). Further, the vehicle control device 30 sets the air flow of the air to be supplied to the assembled battery 1 to an air flow Av2, and outputs, to the battery control device 31, a control signal to drive the blower 4 at the air flow Av2 (S108).

The air-conditioning control device 32 performs an air-conditioning control in the front-seat mode (S113), and the battery control device 31 drives the blower 4 at a rotation number corresponding to the air flow Av2 larger than the air flow Av1 (S114).

At this time, the blow openings 531, 532 for the rear seat are provided below the driver seat and below the front passenger seat, respectively, so as to blow the air into the space S. Further, the inlet port 3a and the exhaust port 5a are provided below the rear seat so as to correspond to the blow openings 531, 532 (see FIGS. 1, 2).

Hereby, the air thus blown from the blow opening 531 into the space S can be directly taken in through the inlet port 3a, thereby making it possible to improve the cooling efficiency of the assembled battery 1. Further, the air exhausted from the exhaust port 5a is the air that performs heat exchange with the assembled battery 1 that generates heat by charge and discharge. Accordingly, by blowing thermoregulated air from the blow opening 532 into the space S against the air exhausted from the exhaust port 5a into the space S, a temperature (exhaust heat temperature) of the air after the heat exchange with the assembled battery 1 can be decreased in the space S.

Then, when it is determined that the battery temperature Tb is not lower than temperature B in steps S105, S106, the vehicle control device 30 proceeds to step S109 to determine whether or not the battery temperature Tb is higher than the temperature B.

When the battery temperature Tb is lower than the temperature B, the vehicle control device 30 sets the prohibition flag of the driver-seat concentration mode to ON, so as to perform the air conditioning in the rear blowing front-seat mode. The vehicle control device 30 outputs, to the air-conditioning control device 32, a control signal of the front-seat mode (S110), and outputs, to the air-conditioning control device 32, a control signal to set, to a permitted state, those blow openings 531, 532 for the rear seat which are controlled to a blocked state (S111). Further, the vehicle control device 30 sets the air flow of the air to be supplied to the assembled battery 1 to an air flow Av3, and outputs, to the battery control device 31, a control signal to drive the blower 4 at the air flow Av3 (S112).

The air-conditioning control device 32 performs the air-conditioning control in the rear blowing front-seat mode with the blow openings 531, 532 being set to a permitted state (S113), and the battery control device 31 drives the blower 4 at a rotation number corresponding to the air flow Av3 larger than the air flow Av2 (S114).

Note that the above description exemplifies an aspect in which the passenger-compartment air conditioning unit 50 performs the air conditioning in three air conditioning modes including the driver-seat concentration mode, the front-seat mode, and the all-seat mode, and also in the rear blowing front-seat mode. However, the passenger-compartment air conditioning unit 50 may be configured to perform the air conditioning in the front-seat mode and in the all-seat mode, but not in the driver-seat concentration mode. For example, in a case where the passenger-compartment air conditioning unit 50 is a passenger-compartment air conditioning unit that does not include the selector valve 54, the air conditioning is performed in the front-seat mode and in the all-seat mode.

In this case, in the example of FIG. 4, when the battery temperature Tb is lower than the temperature B, the air conditioning can be performed in the front-seat mode (a process corresponding to steps S107, 108), and when the battery temperature Tb is higher than the temperature B, the air-conditioning control (a process corresponding to steps S110 to S112) can be performed in the rear blowing front-seat mode by setting the blow openings 531, 532 to a permitted state. Even at this time, when the battery temperature Tb is higher than the temperature B, the battery control device 31 can perform a control to drive the blower 4 at a rotation number corresponding to an air flow larger than an air flow at the time when the battery temperature Tb is lower than the temperature B.

Figure 6:
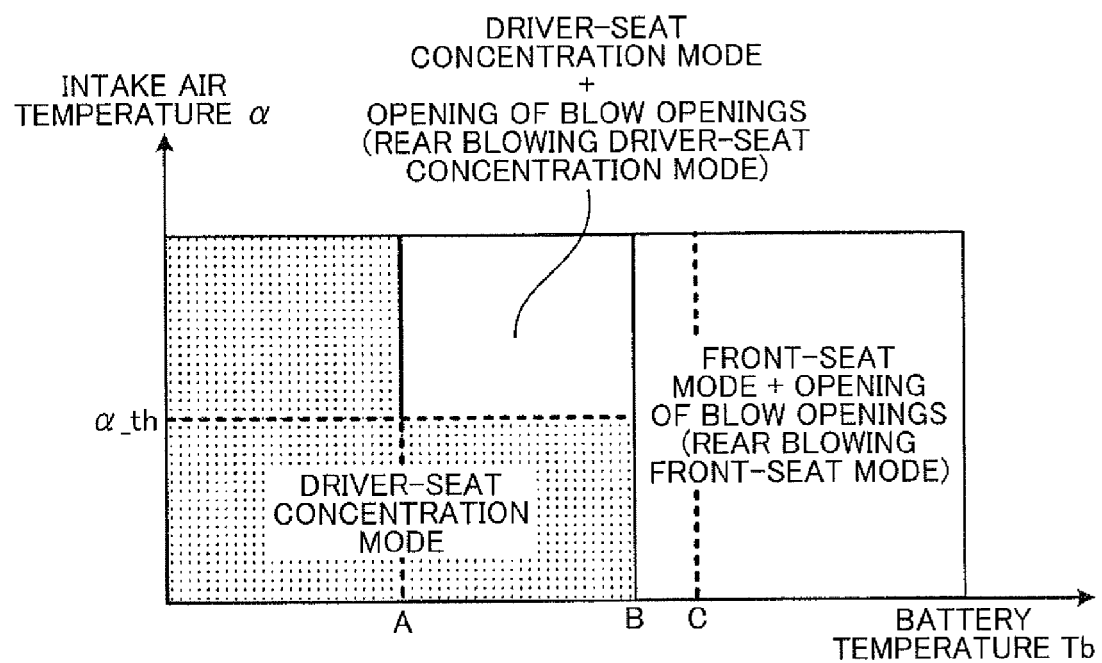
FIG. 6 is a view illustrating a relationship between a battery temperature and an intake air temperature for each air conditioning mode of a passenger-compartment air conditioning unit in Embodiment 2.
Figure 7A:
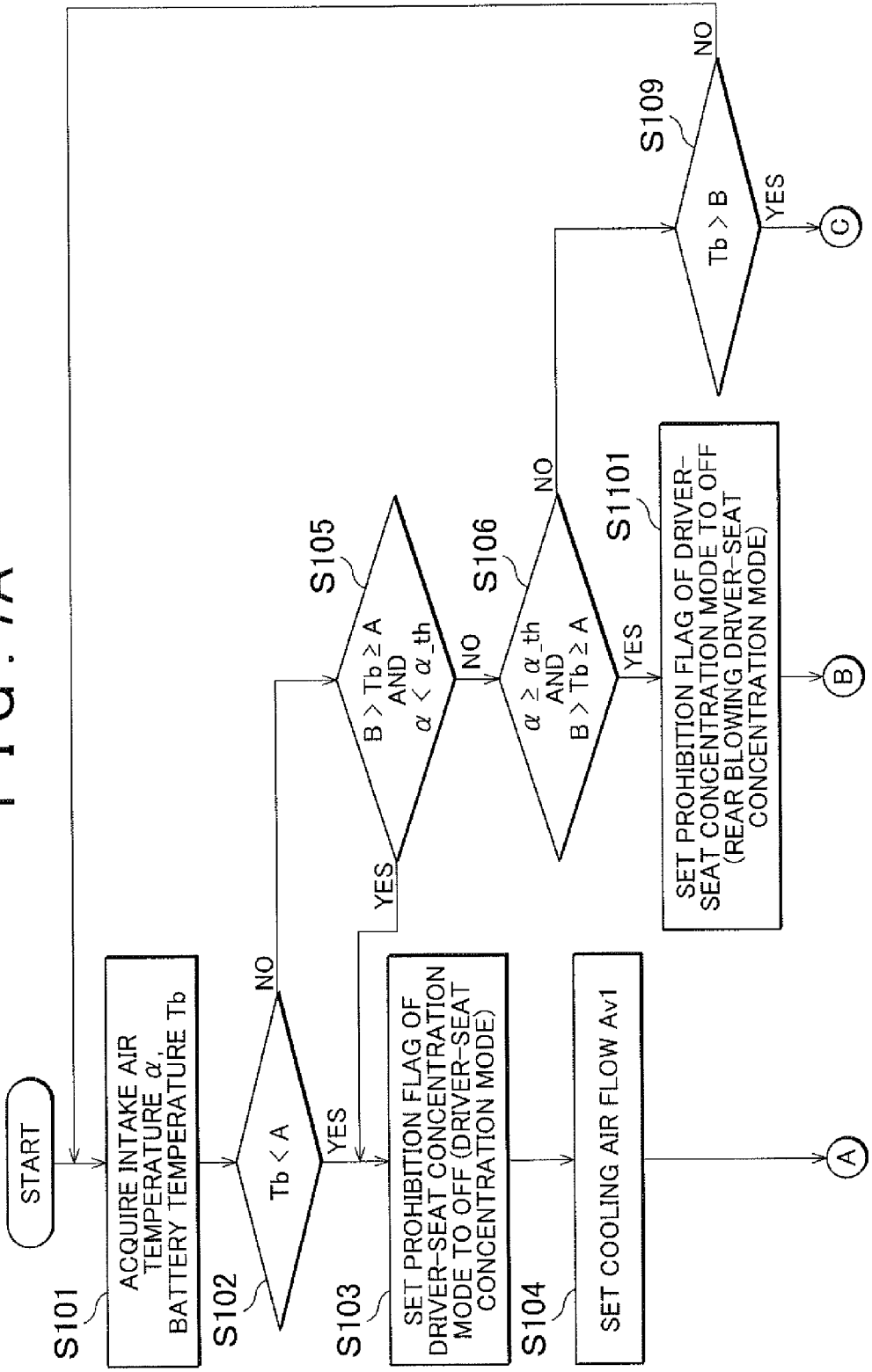
FIG. 7A is a view illustrating a process flow of a vehicle, including a control of the passenger-compartment air conditioning unit in Embodiment 2.

FIGS. 6, 7A and 7B are views illustrating Embodiment 2 of the present invention. FIG. 6 is a view corresponding to the relationship between the battery temperature Tb and the intake air temperature α for each air conditioning mode of the passenger-compartment air conditioning unit 50 as illustrated in the upper part of FIG. 4 of Embodiment 1.

Note that, in the present embodiment, a control of air conditioning modes based on a battery temperature Tb of an assembled battery 1 and configurations of a passenger-compartment air conditioning unit 50 and a vehicle 100 are the same as those in Embodiment 1, so the following mainly describes points different from Embodiment 1, and detailed descriptions thereof are omitted.

Embodiment 1 deals with an aspect in which thermoregulated cooling air is directly supplied to the space S in the front-seat mode as a target mode selected from among the driver-seat concentration mode and the front-seat mode in which the air conditioning is performed by setting the blow openings 531, 532 for the rear seat to a blocked state. However, the present embodiment targets the driver-seat concentration mode.

For example, as illustrated in FIG. 6, when a battery temperature Tb of an assembled battery 1 is higher than a temperature A and an intake air temperature α is higher than a threshold α_th, a driver-seat concentration mode is performed, and a rear blowing driver-seat concentration mode in which blow openings 531, 532 for a rear seat are controlled to a permitted state is performed.

As described above, if the air flow is small, it is possible to lower power consumption to be used in the air conditioning. Accordingly, if the air conditioning is performed in the passenger compartment in the driver-seat concentration mode rather than in the front-seat mode, it is possible to restrain a decrease in fuel efficiency.

In view of this, in a region where the battery temperature Tb is lower than the temperature B, when the battery temperature Tb becomes higher than the temperature A, the air conditioning is not performed in the front-seat mode and the all-seat mode in which power consumption is high, but the driver-seat concentration mode in which power consumption is lowest is performed and the blow openings 531, 532 are controlled to a permitted state, so that thermoregulated cooling air is directly guided to the space S. With such a configuration, it is possible to improve cooling efficiency of the assembled battery 1 by decreasing the intake air temperature of the air to be taken in through the inlet port 3a, and it is possible to restrain an increase in power consumption to be used for the air conditioning in comparison with a case where the battery temperature Tb is lower than the temperature B. Consequently, it is possible to restrain a decrease in fuel efficiency.

Further, such a control can be performed that: when the battery temperature Tb is higher than the temperature A but lower than the temperature B, the rear blowing driver-seat concentration mode is performed as a first stage; and then, as a second stage, when the battery temperature Tb is higher than the temperature B, a rear blowing front-seat mode is performed like Embodiment 1.

If the air conditioning is performed in the driver-seat concentration mode, it is possible to lower power consumption to be used for the air conditioning. On that account, it is desirable to perform the air conditioning in the driver-seat concentration mode if possible so as to restrain a decrease in the fuel efficiency. However, since the air flow in the driver-seat concentration mode is smaller than the air flow in the front-seat mode, even if the blow openings 531, 532 are controlled to a permitted state while the driver-seat concentration mode is performed, cooling performance to a temperature increase of the assembled battery 1 cannot be satisfied.

In view of this, when the battery temperature Tb is higher than the temperature B, the air conditioning is performed in the rear blowing front-seat mode, similarly to Embodiment 1. With such a configuration, it is possible to further improve the cooling efficiency of the assembled battery 1 and to restrain an increasing amount of the power consumption. Consequently, it is possible to restrain a decrease in the fuel efficiency.

Further, in the present embodiment, in a region where the battery temperature Tb is lower than the temperature B, when the battery temperature Tb becomes higher than the temperature A, the blow openings 531, 532 for the rear seat are controlled to a permitted state, so that thermoregulated air is directly supplied to the space S before the battery temperature Tb becomes higher than the temperature B. Accordingly, it is possible to improve the cooling efficiency of the assembled battery 1 in a temperature range between the temperature A and the temperature 13. Such a configuration can make it hard to increase the battery temperature Tb to the temperature B, so that chances to perform the air conditioning in the front-seat mode with high power consumption are restrained, thereby making it possible to improve the fuel efficiency.

The temperature A as a temperature threshold is set to be lower than the temperature B in view of input and output limits of the assembled battery 1. At this time, a temperature range between the temperature A and the temperature B can be set to be larger than a temperature range between the temperature B and the temperature C.

In order to restrain a decrease in the fuel efficiency due to the input and output limits of the assembled battery 1, the temperature B is set in advance as a temperature threshold to improve the cooling efficiency of the assembled battery 1. However, if the front-seat mode is performed at a too early stage, power consumption along with the air conditioning increases, so that the fuel efficiency decreases. Accordingly, the temperature range between the temperature B and the temperature C can be configured so as not to be set too large.

In the meantime, the temperature A is set as a temperature threshold to restrain chances of the air conditioning in the front-seat mode in which power consumption is higher than in the driver-seat concentration mode, by making it hard for the battery temperature Tb to increase to the temperature B, and only the driver-seat concentration mode is performed in the temperature range to the temperature B. Accordingly, even if the rear blowing driver-seat concentration mode is performed at an early stage, power consumption along with the air conditioning does not increase, so that the fuel efficiency does not decrease. In view of this, by setting the temperature range between the temperature A and the temperature B to be larger than the temperature range between the temperature B and the temperature C, it is possible to improve the fuel efficiency.

Note that the rear blowing driver-seat concentration mode in the present embodiment includes controlling the blow openings 531, 532 in a blocked state to a permitted state, and controlling the blow openings 531, 532 in a permitted state so as not to enter a blocked state.

Further, even in the present embodiment, the passenger-compartment air conditioning unit 50 is controlled in consideration of the intake air temperature α in addition to the battery temperature Tb. In Embodiment 1, the control area of the driver-seat concentration mode is enlarged to improve the fuel efficiency. However, in the present embodiment, the control area of the driver-seat concentration mode is enlarged for the following reason.

The air flow in the driver-seat concentration mode is smaller than the air flows in the front-seat mode and the all-seat mode. Accordingly, when the rear blowing driver-seat concentration mode is controlled to be performed, an air flow of the air to be blown from the blow openings 521, 522 for the driver seat is reduced.

In view of this, even in a case where the battery temperature Tb of the assembled battery 1 is higher than the temperature A, if the intake air temperature α of the air to be supplied to the assembled battery 1 from the inlet port 3*a* is lower than the threshold α_th, it is determined that the cooling efficiency to the temperature increase of the assembled battery 1 is satisfied, and the driver-seat concentration mode is performed without controlling the blow openings 531, 532 to a permitted state. With such a configuration, it is possible to restrain a decrease in the air flow of the air to be blown from the blow openings 521, 522 for the driver seat, thereby making it possible to restrain a decrease in the air conditioning performance with respect to the driver seat.

FIG. 7A and FIG. 7B are views illustrating a process flow of the vehicle 100, including the control of the passenger-compartment air conditioning unit 50 of the present embodiment. Note that the same process as in the process in FIG. 5A and FIG. 5B have the same reference sign as in FIG. 5A and FIG. 5B, and its description is omitted.

After steps S105, S106, when it is determined that the battery temperature Tb is lower than temperature B and the intake air temperature α is higher than the threshold α_th, the vehicle control device 30 sets the prohibition flag of the driver-seat concentration mode to OFF, and performs the air conditioning in the rear blowing driver-seat concentration mode. The vehicle control device 30 outputs, to the air-conditioning control device 32, a control signal of the driver-seat concentration mode (S1101), and outputs, to the air-conditioning control device 32, a control signal to set, to a permitted state, those blow openings 531, 532 for the rear seat which are controlled to a blocked state (S1102). Further, the vehicle control device 30 sets an air flow of the air to be supplied to the assembled battery 1 to an air flow Av2, so as to output, to the battery control device 31, a control signal to drive the blower 4 at the air flow Av2 (S1103).

The above description exemplifies Embodiments 1, 2 to describe the present invention. However, an opening degree of the selector valve may be regulated to adjust an air flow of the air to be blown from each blow opening. For example, the air flow from the each blow opening can be adjusted in consideration of the cooling efficiency of the assembled battery 1 and the air conditioning performance in the passenger compartment in such a manner that the air flow to the rear seat is reduced while the air flow to the driver seat or the front seat is secured, or the opening degree of the selector valve 54 is made small in the front-seat mode so as to reduce the air flow to the front passenger seat while increasing the air flow to the rear seat.

Further, Embodiments 1, 2 exemplify an aspect in which the rear blowing front-seat mode distinguished from the front-seat mode is performed, but Embodiments 1, 2 are not limited to this. For example, the control may be performed in the front-seat mode as the air conditioning mode without changing the air conditioning mode, and those blow openings 531, 532 for the rear seat which are controlled to a blocked state may be controlled to a permitted state according to the battery temperature Tb of the assembled battery 1. The same can be said about the rear blowing driver-seat concentration mode corresponding to the driver-seat concentration mode.

What is claimed is:

1. A vehicle comprising:
   a drive motor;
   a battery configured to supply a power to the drive motor;
   a front seat including a driver seat;
   a rear seat;
   a passenger-compartment air conditioning unit configured to supply thermoregulated air to a passenger compartment, the passenger-compartment air conditioning unit including
      a plurality of blow openings configured to blow air to the front seat and the rear seat, and
      an opening and closing mechanism configured to change each of the plurality of blow openings between a first state and a second state, the first state being a state in which the air is permitted to be blown from the each of the plurality of blow openings, the second state being a state in which the air to be blown from the each of the plurality of blow openings is blocked;
   an inlet port configured to take air in the passenger compartment from a space between the front seat and the rear seat;
   a blower configured to supply the air taken through the inlet port to the battery;
   a temperature sensor configured to detect a temperature of the battery; and
   a controller configured to
      (a) control the passenger-compartment air conditioning unit so as to selectively perform a first air conditioning mode, a second air conditioning mode, and a third air conditioning mode, and
      (b) control the passenger-compartment air conditioning unit so as to perform the third air conditioning mode when the temperature of the battery is higher than a first temperature threshold,
   the first air conditioning mode being a mode in which blow openings for the rear seat are set to the second state, and the air supplied from the passenger-compartment air conditioning unit is blown from the other blow openings set to the first state,
   the second air conditioning mode being a mode in which the air is supplied from the passenger-compartment air conditioning unit at an air flow larger than the air flow in the first air conditioning mode, and the air is blown by setting the blow openings for the rear seat to the first state as well as the other blow openings, and
   the third air conditioning mode being a mode in which the air is blown by setting the blow openings for the rear seat which are set to the second state in the first air conditioning mode to the first state.

2. The vehicle according to claim 1, wherein
   the first air conditioning mode is a mode in which the air is supplied from the passenger-compartment air conditioning unit at a first air flow, and the air is blown by setting blow openings for the front seat to the first state and setting the blow openings for the rear seat to the second state, the second air conditioning mode is a mode in which the air is supplied from the passenger-compartment air conditioning unit at a second air flow, the second air flow being larger than the first air flow, and the air is blown by setting the blow openings for the front seat and the blow openings for the rear seat to the first state, the third air conditioning mode is a mode in which the air is blown at the first air flow by setting the blow openings for the rear seat which are set to the second state in the first air conditioning mode to the first state, and the controller is configured to control the passenger-compartment air conditioning unit so as to perform the first air conditioning mode when the temperature of the battery is lower than the first temperature threshold, and control the passenger-compartment air conditioning unit so as to perform the third air conditioning mode when the temperature of the battery is higher than the first temperature threshold.

3. The vehicle according to claim 1, wherein the first air conditioning mode includes a driver-seat concentration mode and a front-seat mode, the driver-seat concentration mode being a mode in which the air is supplied from the passenger-compartment air conditioning unit at a first air flow, and the air is blown by setting only blow openings for the driver seat to the first state, the front-seat mode being a mode in which the air is supplied from the passenger-compartment air conditioning unit at a second air flow, and the air is blown by setting blow openings for the front seat to the first state and by setting the blow openings for the rear seat to the second state, the second air flow being larger than the first air flow, the second air conditioning mode is a mode in which the air is supplied from the passenger-compartment air conditioning unit at a third air flow, and the air is blown by setting the blow openings for the front seat and the blow openings for the rear seat to the first state, the third air conditioning mode is a mode in which the air is blown at the second air flow by setting the blow openings for the rear seat which are set to the second state in the front-seat mode to the first state, and the controller is configured to control the passenger-compartment air conditioning unit so as to perform the driver-seat concentration mode when the temperature of the battery is lower than the first temperature threshold, and control the passenger-compartment air conditioning unit so as to perform the third air conditioning mode when the temperature of the battery is higher than the first temperature threshold.

4. The vehicle according to claim 1, wherein the controller is configured to regulate the air flow of the air supplied to the battery through a drive control of the blower, and perform the drive control of the blower so as to supply the air to the battery at an air flow larger than an air flow set at the time when the temperature of the battery is lower than the first temperature threshold, when the temperature of the battery is higher than the first temperature threshold.

5. The vehicle according to claim 1, wherein the first temperature threshold is lower than a second temperature threshold, the second temperature threshold being a temperature to limit input and output of the battery.

6. The vehicle according to claim 3, further comprising:

an intake air temperature sensor configured to detect an intake air temperature of the air supplied to the battery through the inlet port, wherein the controller is configured to control the passenger-compartment air conditioning unit so as to perform the driver-seat concentration mode when the temperature of the battery is higher than a third temperature threshold and the intake air temperature is lower than a predetermined value, and control the passenger-compartment air conditioning unit so as to perform the front-seat mode when the temperature of the battery is higher than the third temperature threshold and the intake air temperature is higher than the predetermined value, the third temperature threshold being a temperature set to be lower than the first temperature threshold.

7. The vehicle according to claim 1, wherein the first air conditioning mode includes a driver-seat concentration mode and a front-seat mode, the driver-seat concentration mode being a mode in which the air is supplied from the passenger-compartment air conditioning unit at a first air flow, and the air is blown by setting only blow openings for the driver seat to the first state, the front-seat mode being a mode in which the air is supplied from the passenger-compartment air conditioning unit at a second air flow, and the air is blown by setting blow openings for the front seat to the first state and by setting blow openings for the rear seat to the second state, the second air flow being larger than the first air flow, the second air conditioning mode is a mode in which the air is supplied from the passenger-compartment air conditioning unit at a third air flow, and the air is blown by setting the blow openings for the front seat and the blow openings for the rear seat to the first state, the third air flow being larger than the second air flow, the third air conditioning mode is a mode in which the air is blown at the first air flow by setting the blow openings for the rear seat which are set to the second state in the driver-seat concentration mode to the first state, and the controller is configured to control the passenger-compartment air conditioning unit so as to perform the driver-seat concentration mode when the temperature of the battery is lower than the first temperature threshold, and control the passenger-compartment air conditioning unit so as to perform the third air conditioning mode when the temperature of the battery is higher than the first temperature threshold.

8. The vehicle according to claim 7, wherein the controller is configured to control the passenger-compartment air conditioning unit so as to selectively perform a fourth air conditioning mode, control the passenger-compartment air conditioning unit so as to perform the third air conditioning mode when the temperature of the battery is higher than the first temperature threshold and the temperature of the battery is lower than a fourth temperature threshold, and control the passenger-compartment air conditioning unit so as to perform the fourth air conditioning mode when the temperature of the battery is higher than the fourth temperature threshold, the fourth air conditioning mode is a mode in which the air is blown at the second air flow by setting the blow openings for the rear seat which are set to the second state in the front-seat mode to the first state, the fourth temperature threshold is set to be higher than the first temperature threshold.

9. The vehicle according to claim 7, further comprising:
an intake air temperature sensor configured to detect an intake air temperature of the air supplied to the battery through the inlet port,
wherein the controller is configured to
control the passenger-compartment air conditioning unit so as to perform the driver-seat concentration mode when the temperature of the battery is higher than the first temperature threshold and the intake air temperature is lower than a predetermined value, and
control the passenger-compartment air conditioning unit so as to perform the third air conditioning mode when the temperature of the battery is higher than the first temperature threshold and the intake air temperature is higher than the predetermined value.

10. The vehicle according to claim 1, wherein
the blow openings for the rear seat are provided below the driver seat and below a front passenger seat, respectively, so as to blow the air into the space, the front passenger seat and the driver seat constitute the front seat,
the inlet port and an exhaust port are provided below the rear seat so as to correspond to the blow openings for the rear seat, respectively, and
the exhaust port exhausts the air supplied to the battery into the passenger compartment.

* * * * *